United States Patent Office 2,801,935
Patented Aug. 6, 1957

2,801,935

THE USE OF HYDRAZINE TARTRATE SALTS IN THE CHEMICAL DEPOSITION OF METALS

John T. Owen, Bloomfield, N. J., assignor to Merck & Co., Inc., Rahway, N. J., a corporation of New Jersey No Drawing. Application September 30, 1953, Serial No. 383,399

6 Claims. (Cl. 117—35)

This invention relates to derivatives of hydrazine. More particularly, this invention is concerned with novel tartaric acid salts of hydrazine and methods of producing such salts. It is also concerned with improved methods for the chemical deposition of metals, such as silver and copper, which utilize these novel tartaric acid salts of hydrazine.

The novel tartaric acid salts of hydrazine which are provided according to this invention are the monohydrazine tartrate and the dihydrazine tartrate. The monohydrazine tartrate may be represented by the formula $N_2H_4 \cdot C_4H_6O_6$ and dihydrazine tartrate by the formula $(N_2H_4)_2 \cdot C_4H_6O_6$. It is thus seen that monohydrazine tartrate is composed of molar equivalents of hydrazine and tartaric acid while two molar equivalents of hydrazine combine with one molar equivalent of tartaric acid to produce dihydrazine tartrate.

The preparation of monohydrazine tartrate and dihydrazine tartrate may be effected by reacting the appropriate amount of hydrazine with a suitable amount of tartaric acid. Thus, the reaction of approximately molar equivalents of hydrazine and tartaric acid results in the preparation of monohydrazine tartrate. The dihydrazine tartrate is obtained in a similar manner by reacting approximately two molar equivalents of hydrazine with one molar equivalent of tartaric acid.

These salts may be conveniently produced by contacting the predetermined amounts of hydrazine and tartaric acid in a suitable solvent. For this purpose, water has been found to be a particularly useful solvent although other solvent such as the lower alcohols may also be used. The reaction proceeds at ordinary temperature to produce the desired salts although elevated temperatures are sometimes used advantageously, particularly when forms of tartaric acid and hydrazine are employed as reactants which have low solubilities. However, the reaction proceeds quickly at both ordinary and elevated temperatures to produce the desired salts.

Isolation of the salt from the reaction mixture is readily achieved by the application of conventional methods. Thus, the reaction mixture may be cooled, preferably to below room temperature, to crystallize the product which may then be separated by filtration and dried. If desired, the salts may be purified by recrystallization from water.

The monohydrazine and dihydrazine tartrate salts may be conveniently prepared according to this method by the utilization of either hydrazine or a suitable hydrazine compound as the reactant. For example, hydrazine hydrate and available salts of hydrazine such as hydrazine monohydrochloride, monohydrazine sulfate, hydrazine mononitrate and the like may be used as starting materials in the production of the desired tartrate salts. Furthermore, this reaction may be achieved not only by the use of tartaric acid but also by the employment of salts of tartaric acid such as disodium tartrate, dipotassium tartrate and mixed salts such as sodium-potassium tartrate (Rochelle salt) and the like as starting materials.

According to a further embodiment of the present invention, it has been found that monohydrazine tartrate and dihydrazine tartrate are highly suitable reducing agents for use in effecting the chemical deposition of metals such as silver, copper and nickel on plastics, glass and other non-conductors.

The technique of depositing metals on nonconductors which comprises contacting the objects to be plated with a basic solution of a salt of a metal in the presence of a reducing agent has been known for many years. Nevertheless, the usefulness of this method has been severely limited because of the difficulty encountered in producing high quality metal plates with the ordinary reducing agents such as formaldehyde, dextrose and hydrazine sulfate. These reducing agents often had the effect of producing a lifting of the metal film and frequently caused the plate to discolor and bloom. In addition, plates of average quality could only be obtained when these reducing agents were used in the form of complex solutions comprising more than one reducing agent and various other organic compounds. Also, the composition and purity of such solutions had to be rigidly controlled. Furthermore, hydrazine sulfate and similar hydrazine salts known heretofore, when used in the absence of other reducing agents, often result in the evolution of gases and the formation of sludge during the reduction which prevent the plate from adhering tightly and cause it to discolor.

By the present invention these and other disadvantages are eliminated and plates of superior quality are obtained by employing monohydrazine tartrate or dihydrazine tartrate as reducing agents for the chemical deposition of metals such as silver, copper and nickel. Furthermore, the desired deposition of metal may be readily effected with these reducing agents in the absence of other reducing agents or additional substances. The resulting metal plates produced by the use of these reducing agents are characterized by a uniform brightness and are free of discoloration, pinholes and other defects normally encountered with other reducing agents. Such plates are also securely bound to the plated object.

Monohydrazine tartrate or dihydrazine tartrate may be used in the chemical deposition of metals from any of the metallic solutions ordinarily used for this purpose. For example, these salts may be used to reduce Fehling's solution or modified forms thereof to produce a superior copper plate, or to produce a silver plate by the reduction of a solution of a silver salt such as an ammoniacal solution of silver nitrate.

Superior metal plates are conveniently produced according to this invention by contacting the object to be plated with a solution of a metal commonly used for this purpose in the presence of an aqueous solution of monohydrazine tartrate or dihydrazine tartrate. Because the reducing effect of these salts begins quickly the solutions are preferably combined just prior to, or simultaneously upon, contact with the object to avoid undesirable deposition of metal. One satisfactory method is to mix the solutions and pour the composite mixture over the object. Generally, however, it is preferred to force the solutions through independent nozzles which produce sprays that mix just prior to contact with the surface of the object being plated. In producing plates by these methods any convenient concentrations of both reducing and metal solutions may be used which are suitable for the purpose.

The described plating methods of this invention are particularly suitable for copper-coating the backs of silver mirrors to further protect the silver against accidental abrasions through handling and deteriorations by aging. Paints and shellac are sometimes used to protect silver mirrors but solvents and other ingredients present in such materials often have a deleterious effect on the silver. Electrolytic methods for the deposition of copper on mirrors often cause lifting of the silver and do not effect coverage of pin-hole defects in the silver plate. On the other hand, chemical deposition of copper on silver mirrors has been tried before using the available reducing agents but with generally unsatisfactory results. The greatest trouble encountered with these reducing agents during the deposition of copper is frequent lifting of the silver film. Now, however, it is possible to put copper coats on silver mirrors which cover all pin-holes and without harm to the silver by the employment of monohydrazine tartrate or dihydrazine tartrate as reducing agents, preferably as aqueous solutions.

The monohydrazine tartrate and dihydrazine tartrate salts are useful in the production of other derivatives of hydrazine. In addition, these salts are of use in photography, the manufacture of dyes and in the production of plastics.

EXAMPLE 1

*Monohydrazine tartrate*

To 750 ml. of water is added 450 g. of tartaric acid and 176 g. of 85% hydrazine hydrate. Crystallization of monohydrazine tartrate begins at once. The mixture is chilled to 0° C. and the crystals are collected, washed with ice water and air dried at 50° C. The melting point is 182–183° C.

EXAMPLE 2

*Dihydrazine tartrate*

About 29 g. of 85% hydrazine hydrate is added to 100 ml. of water and then 38 g. of tartaric acid. The dihydrazine tartrate is recovered by cooling the mixture in an ice bath and filtering.

EXAMPLE 3

*Deposition of silver*

To about 28 g. of pure silver nitrate in one pint of water is added sufficient ammonium hydroxide to barely redissolve the precipitate which forms. The solution is filtered to remove impurities and the solution made up to one gallon with water.

A reducing solution is prepared by dissolving about 10 g. of monohydrazine tartrate in one quart of water.

The two solutions are then simultaneously poured or sprayed over glass. After washing with water, the silver mirror is dried. It is bright and free of imperfections.

EXAMPLE 4

*Deposition of copper on a silver mirror*

Separate one liter aqueous solutions are prepared containing 180 g. of sodium-potassium tartrate (Rochelle salt), 70 g. of sodium hydroxide and 40 g. of copper sulfate. The tartrate solution is added to the copper sulfate solution and to the mixture is added the one liter solution of sodium hydroxide. The mixture is then brought to 4 liters with water.

A reducing solution is prepared containing 21 g. of monohydrazine tartrate in 4 liters of water.

The solutions are warmed to about 40° C. and simultaneously poured onto the silver mirror. After 1 to 2 minutes the surface is flushed with water and allowed to dry. The copper coat is then painted.

What is claimed is:

1. In the art of producing metal plates by the chemical depositions of a metal selected from the group consisting of silver and copper, from a solution of a salt of such metal, by treating such metal solutions with a reducing agent, the improvement which comprises using a tartaric acid salt of hydrazine as the reducing agent.

2. In the art of making mirrors and the like wherein silver is chemically deposited on a non-conductive surface, the improvement which comprises treating the silvered surface simultaneously with a solution of a copper salt, sodium-potassium tartrate and alkali and a solution of a tartaric acid salt of hydrazine as a reducing agent, to form a copper backing over the silvered surface which covers pin-holes in the silvered surface and provides a durable backing therefor without injury to the silvered surface.

3. In the art of depositing a copper film by the chemical deposition of copper from a solution of a copper salt by treating such solution with a reducing agent, the improvement which comprises using a tartaric acid salt of hydrazine as the reducing agent.

4. The method of claim 3 in which the tartaric acid salt of hydrazine is monohydrazine tartrate.

5. In the art of depositing a silver film by the chemical deposition of silver from a solution of a silver salt by treating such solution with a reducing agent, the improvement which comprises using a tartaric acid salt of hydrazine as the reducing agent.

6. The method of claim 5 in which the tartaric acid salt of hydrazine is monohydrazine tartrate.

References Cited in the file of this patent

UNITED STATES PATENTS

| | | |
|---|---|---|
| 2,214,476 | Peacock | Sept. 10, 1940 |
| 2,355,933 | Weiss | Aug. 15, 1944 |
| 2,512,601 | Bates et al. | June 27, 1950 |
| 2,614,943 | Franza | Oct. 21, 1952 |

OTHER REFERENCES

Ohlgart: C. A. 12, 900 (1918).

Audrieth et al.: The Chemistry of Hydrazine, John Wiley & Sons, Inc., 1951, page 177.